Dec. 30, 1958   E. T. NEW   2,866,890
TEAR-DROP-SHAPED ELECTRIC BICYCLE LANTERNS
Filed June 4, 1956   2 Sheets-Sheet 1
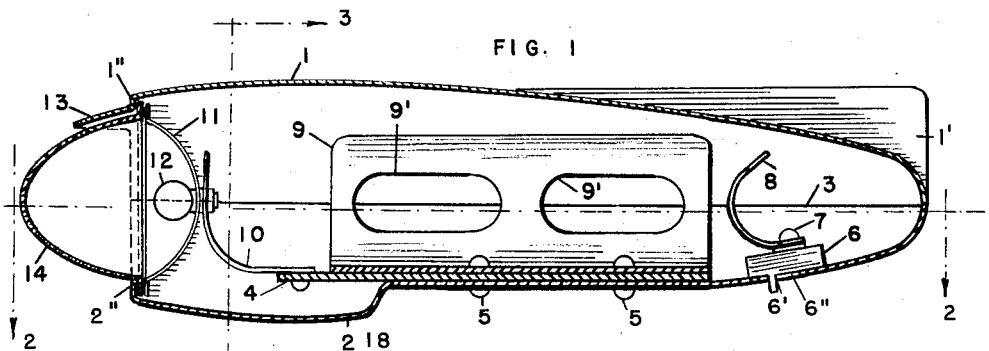
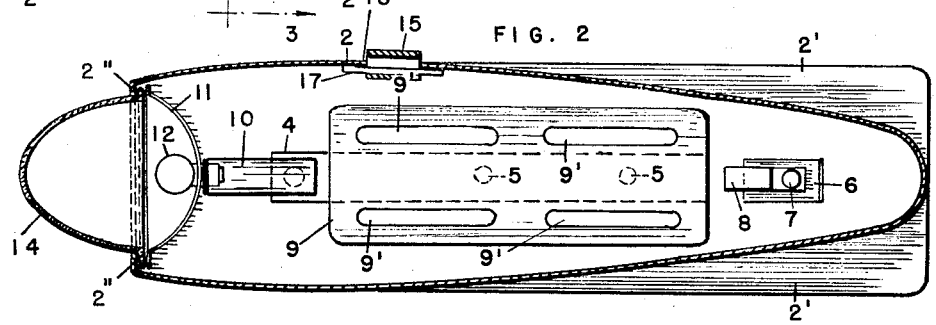
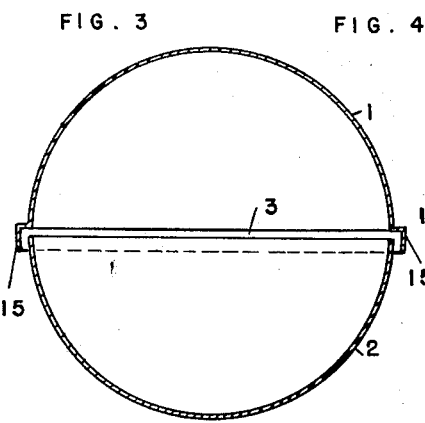
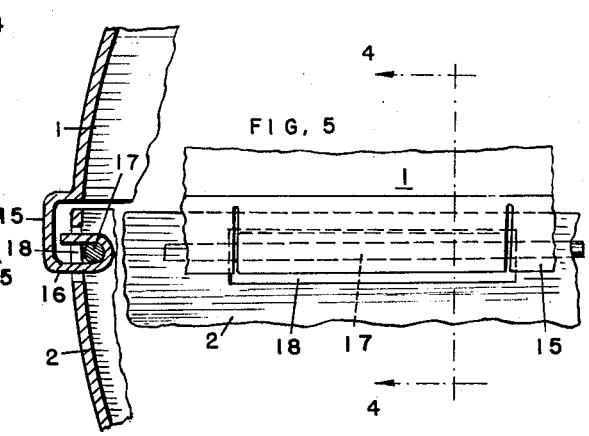
INVENTOR:
ERIC T. NEW
BY ATTY.

Dec. 30, 1958  E. T. NEW  2,866,890
TEAR-DROP-SHAPED ELECTRIC BICYCLE LANTERNS
Filed June 4, 1956  2 Sheets-Sheet 2

INVENTOR
ERIC T. NEW
BY
ATTORNEY

United States Patent Office 2,866,890
Patented Dec. 30, 1958

2,866,890

TEAR-DROP-SHAPED ELECTRIC BICYCLE LANTERNS

Eric Tom New, New York, N. Y.

Application June 4, 1956, Serial No. 589,119

2 Claims. (Cl. 240—7.55)

This invention refers to electric bicycle lanterns, and more particularly to tear-drop-shaped electric bicycle lanterns.

As a general rule, it is quite easy to replace burned-out incandescent lamps in battery operated electric lanterns as, for instance, flashlights. The structure of tear-drop-shaped electric bicycle lanterns is, however, of such a nature as to make the replacement of burned-out incandescent lamps a relatively difficult task, often requiring the aid of a tool such as a screw driver.

It is, therefore, one object of this invention to provide a tear-drop-shaped electric bicycle lantern enabling ready tool-less replacement of burned-out incandescent lamps.

Another object of the invention is to provide a tear-drop-shaped electric bicycle lantern enabling ready tool-less replacement of both burned-out incandescent lamps and batteries or dry cells.

Still another object of the invention is to provide a tear-drop-shaped electric bicycle lantern comprising a removable part having the dual function of enabling ready tool-less replacement of burned-out incandescent lamps and of normally operating as a light-beam-limiting visor.

Other objects and advantages of the invention will, in part, be obvious and in part appear hereinafter.

For a more complete understanding of the invention reference may be had to the following detailed description thereof taken in connection with the accompanying drawing in which:

Fig. 1 is a vertical longitudinal section through a bicycle lantern embodying my invention;

Fig. 2 is substantially a section along 2—2 of Fig. 1 showing some of the parts in top-plan view rather than in section;

Fig. 3 is a section along 3—3 of Fig. 1 on a larger scale than Fig. 1, the internal structure of the lantern casing being omitted in Fig. 3;

Fig. 4 is a cross-section of a hinge structure taken along 4—4 of Fig. 5;

Fig. 5 is a side elevation of the hinge structure shown in Fig. 4; and

Figure 6:
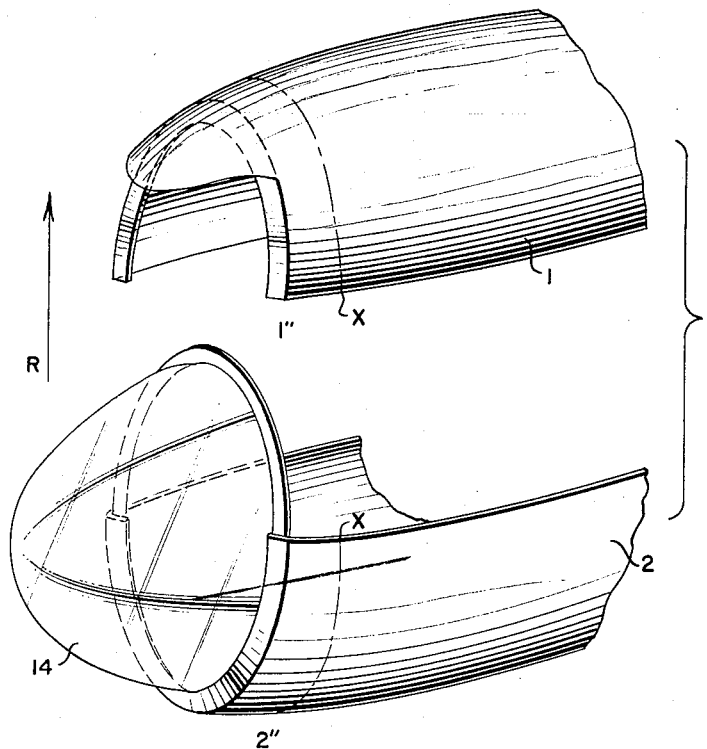
Fig. 6 is an isometric exploded view of the front end of a modified embodiment of the invention.

Referring now to the drawing, and more particularly to Figs. 1 and 2 thereof, reference numeral 1 has been applied to indicate the upper portion of the casing of a tear-drop-shaped or streamlined bicycle lantern comprising the dorsal fin 1'. Upper casing portion 1 covers the lower casing portion 2 provided with two horizontal fins 2'. Reference numeral 3 has been applied to indicate the line of separation of casing portions 1 and 2, or the extremely narrow gap formed therebetween. The bottom of lower casing portion 2 supports metal strip 4 which may be riveted to it, as by rivets 5. Rivets 5 may also be used to attach the semicylindrical battery holder 9 to casing portion 2. The battery holder 9 is provided with four cutouts 9' to minimize the weight thereof. Switch 6 accommodated in the rear end of casing 1, 2 has a manual operator 6' projecting through a slot 6" in casing portion 2. Leaf spring 8 is secured to the top of switch 6, as by a rivet 7, and tends to bias forwardly batteries or dry cells (not shown) inserted into battery holder 9. The front end of metal strip 4 supports a leaf spring 10 which, if desired, may be integrated with reflector 11 to form a unitary structure. The structure is adapted to form a lamp holder for the incandescent lamp 12 which may either have a screw-threaded shell for lamp 12, or a bayonet type socket, as desired. Spring 10 biases reflector 11 and lamp 12 in forward direction. The circular flange of lens 14 is engaged by the circular flange of reflector 11, and thus also biased in forward direction by the action of spring 10. Lens 14 may be either of the convex, streamlined type—as shown—or the flat type, and is preferably made of a suitable plastic substance. Lens 14 is held in position by a separable split-ring structure 1" and 2" which forms on integral part of the upper and lower casing portions 1, 2. In the embodiment of the invention shown the upper split-ring portion 1" forms an integral part of the upper casing portion 1 and the lower split-ring portion 2" forms an integral part of the lower casing portion 2. Split-ring 1", 2" positions lens 14 relative to casing 1, 2 by virtue of shoulder portions thereon engaged by the outer periphery, or flange, of lens 14. The lower part 2" of split-ring 1", 2" is substantially flush with the plane defined by the front end of reflector 11, and the upper part 1" which is separable from the lower part 2" projects beyond said plane to form a beam-limiting visor 13. Upon separation of upper part 1" of the split-ring 1", 2" from the lower part 2" thereof, lens 14 may readily be slid out of lower part 2" in a direction transversely to the longitudinal geometrical axis of casing 1, 2 thus giving access to lamp 12 and enabling ready renewal thereof from the front end of reflector 11.

As best shown in Fig. 3, upper portion 1 of casing 1, 2 is provided with a skirt 15 overlapping slit 3 formed between casing portions 1 and 2. Skirt 15 may be used to form a hinge enabling to pivot part 1 relative to part 2. As clearly shown in Figs. 4 and 5, a portion of skirt 15 forms a tab-like extension 16 bent substantially in the form of a U and projecting through an aperture 18 into the inside of casing 1, 2. Pin 17 is inserted into the U-shaped portion 16 of skirt 15 and abuts with the ends thereof against the inner surface of lower casing portion 2. Upon opening of casing 1, 2 by pivoting of portion 1 about pin 17, lamp 12 as well as the batteries or dry cells in holder 9 can readily be replaced, no tool being required for either operation.

It will be apparent from the foregoing that the tear-drop-shaped lamp illustrated and described comprises a split ring 1", 2" arranged in a plane at right angles to the longitudinal axis of casing 1, 2 and forming an integral part thereof. Ring 1", 2" is subdivided along a straight line extending through the center thereof to form two complementary ring portions 1" and 2". One of said ring portions 1" is adapted to be moved inside of the plane defined by said ring 1", 2" relative to, and away from, the center of the ring to effect separation of the portions 1" and 2" of the ring.

Casing parts 1 and 2 may be provided at the points thereof radially opposite hinge 16, 17 with any conventional latch mechanism (not shown) for securing part 1 to part 2.

If desired part 1 may be adapted to be lifted vertically from part 2 rather than being hinged to it.

Referring now to Fig. 6, numeral 1 has been applied to indicate the upper portion of a casing and numeral 2 has been applied to indicate the lower portion of a casing substantially identical with the casing shown in the previous figures and described in connection therewith. Reference numeral 1" indicates the upper portion of a split lens holder ring and reference numeral 2" indicates the lower portion of a split lens holder ring. In Fig. 6 the lens holder part 1″ is integral with casing part 1 and lens holder part 2″ is integral with casing part 2, as shown in the previous figures. This, however, does not necessarily have to be so. Lens holder part 1″ and lens holder part 2″ might be severed along the dashed-and-dotted lines X—X from the main body of the casing. Fig. 6 is a diagrammatic illustration intended to better explain the split ring lens holder concept enabling the lateral toolless removal of lens 14 along the line indicated by the arrow R to readily obtain access to the incandescent lamp situated behind the lens 14.

It will be understood that I have illustrated and described herein a preferred embodiment of the invention, and that various alterations may be made in the details thereof without departing from the spirit and scope of the invention as defined in the appended claims.

I claim:

1. In a tear-drop-shaped electric bicycle lantern the combination of a casing having a geometrical axis extending in a direction longitudinally thereof and comprising a lower shell and a complementary upper shell; said casing accommodating and said lower shell thereof supporting the following parts: an incandescent lamp, a reflector for said lamp in the shape of a concave surface of revolution having a wide open side forming a substantially circular flange, a socket on said reflector for said lamp, spring means biasing said reflector in forward direction, a battery holder arranged behind said reflector and a switch arranged behind said battery holder; said lantern further comprising a lens having a circular periphery arranged in front of said reflector and engaged along said periphery by said circular flange of said reflector; a split ring arranged in a plane at right angles to said axis of said casing and forming an integral part thereof, said ring being subdivided along a straight line extending through the center thereof to form two complementary ring portions, one of said portions being adapted to be moved in the plane defined by said ring relative to and away from said center of said ring to effect separation of said portions of said ring; each of said portions of said ring comprising a semi-circular flange engaging the front surface of said lens along a peripheral margin thereof; and said lens being removable from said casing in a direction transversely to the axis thereof upon separation of said portions of said ring thereby giving ready access to said lamp from said wide open side of said reflector.

2. In a tear-drop-shaped electric bicycle lantern the combination of a casing having a geometrical axis extending in a direction longitudinally thereof and comprising a lower shell and a complementary upper shell hingedly supported by said lower shell; said casing accommodating and said lower shell thereof supporting the following parts: an incandescent lamp, a reflector for said lamp in the shape of a concave surface of revolution having a wide open side forming a substantially circular flange, a socket on said reflector for said lamp, spring means biasing said reflector in forward direction, a battery holder arranged behind said reflector and a switch arranged behind said battery holder; said lower shell forming a first substantially semi-circular flange on the front end thereof; a lens having a circular periphery and having a front surface and a rear surface, said lens being arranged in front of said reflector and engaged by said circular flange thereof and said front surface of said lens engaging said substantially semi-circular flange formed by said lower shell; and said upper shell comprising a relatively short visor portion and a relatively long body portion forming therebetween a second semi-circular flange engaging said front surface of said lens along a peripheral margin thereof.

References Cited in the file of this patent

UNITED STATES PATENTS

| | | |
|---|---|---|
| 1,121,882 | Williams | Dec. 22, 1914 |
| 1,554,427 | Englen | Sept. 22, 1925 |
| 1,806,209 | Major | May 19, 1931 |
| 1,883,681 | Gage | Oct. 18, 1932 |
| 2,056,153 | Belson | Oct. 6, 1936 |
| 2,106,231 | Wiley | Jan. 25, 1938 |
| 2,465,114 | Qury | Mar. 22, 1949 |
| 2,614,206 | Goad | Oct. 14, 1952 |